United States Patent [19]

Levinson et al.

[11] Patent Number: 4,770,529
[45] Date of Patent: Sep. 13, 1988

[54] ALIGNMENT OF OPTICAL WAVEGUIDES

[75] Inventors: Frank H. Levinson, Redwood City; Joseph Zucker, Foster City; Nelson M. Shen, San Jose; Robert Schlingensiepen, San Francisco, all of Calif.

[73] Assignee: Raychem Corp., Menlo Park, Calif.

[21] Appl. No.: 904,750

[22] Filed: Sep. 8, 1986

[51] Int. Cl.⁴ .............................................. G01B 11/26
[52] U.S. Cl. ..................................... 356/153; 356/73.1
[58] Field of Search ....................... 356/138, 153, 73.1

[56] References Cited

U.S. PATENT DOCUMENTS

| | | | |
|---|---|---|---|
| 4,289,398 | 9/1981 | Robichaud | 356/73.1 |
| 4,361,402 | 11/1982 | Costa | 356/73.1 |
| 4,474,469 | 10/1984 | Abe | 356/153 |

Primary Examiner—R. A. Rosenberger
Assistant Examiner—Crystal Cooper
Attorney, Agent, or Firm—Dennis E. Kovach; Herbert G. Burkard

[57] ABSTRACT

A method of aligning an optical signal source and a waveguide which comprises; directing the signal into the waveguide, monitoring the intensity of the signal backscattered along the waveguide, and altering the relative positions of source and waveguide in response to said intensity.

12 Claims, 2 Drawing Sheets

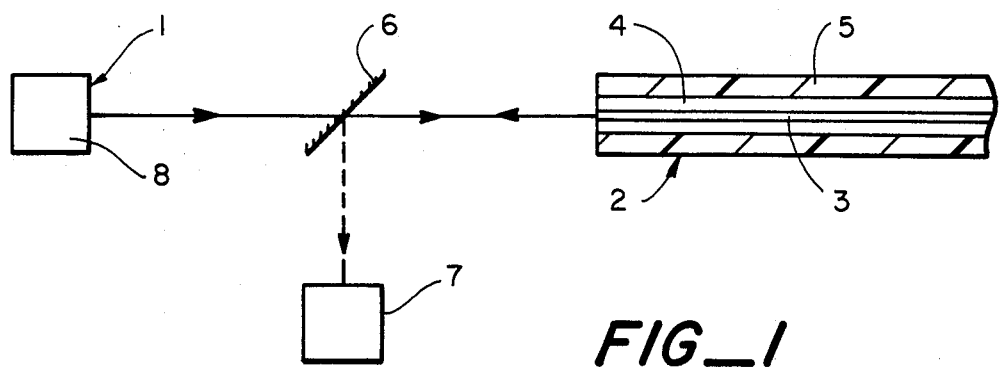
FIG_1
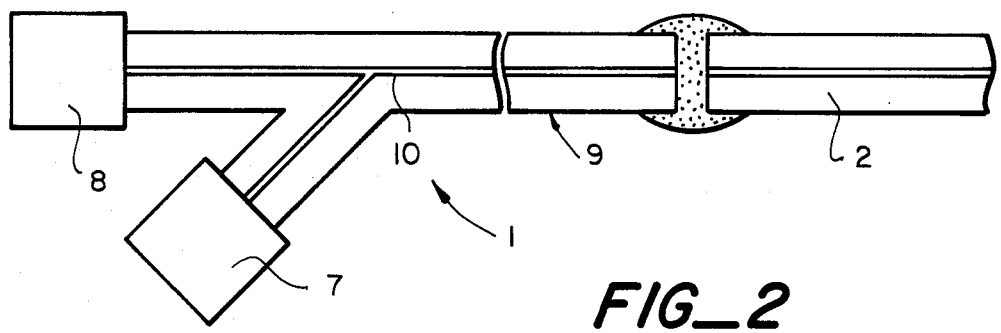
FIG_2
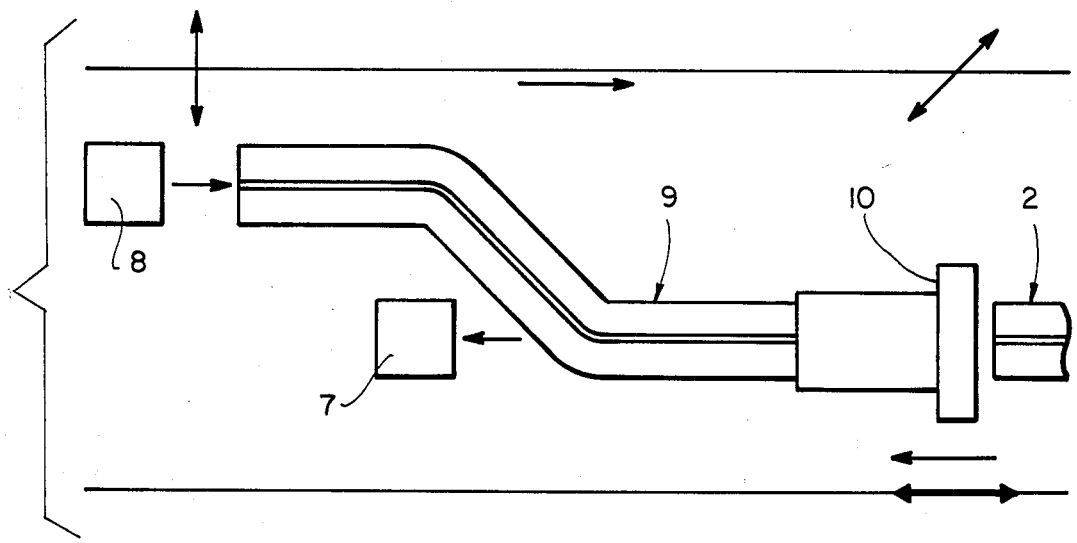
FIG_3

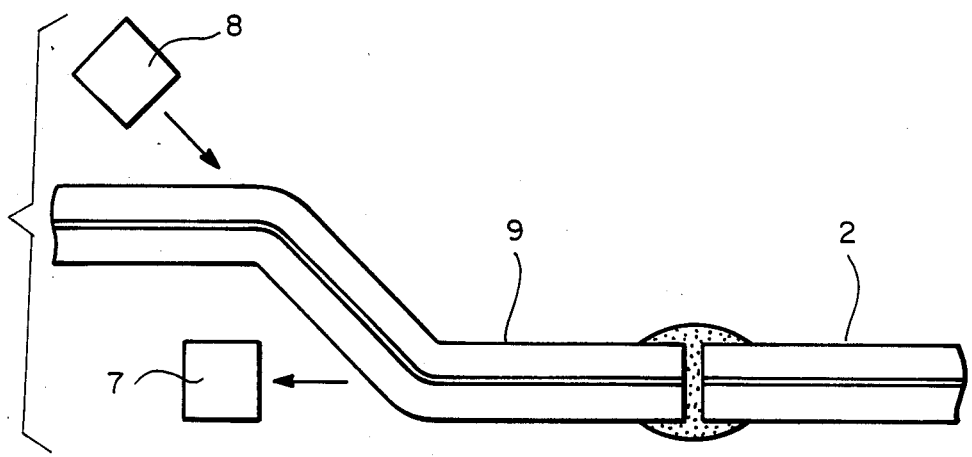
FIG_4
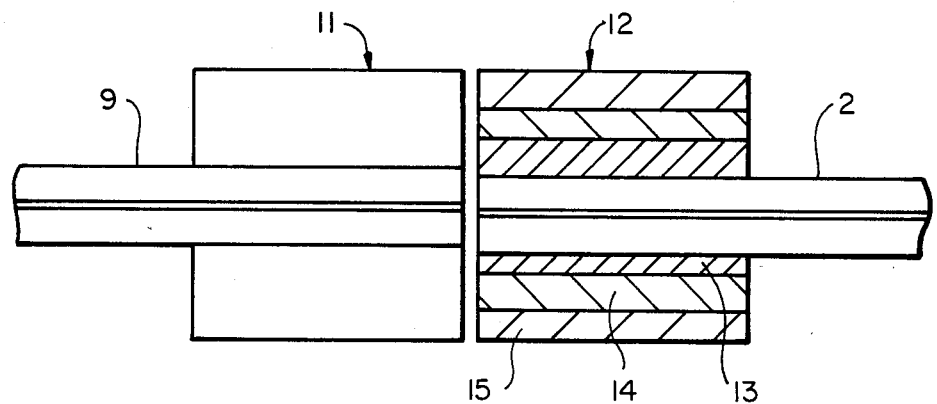
FIG_5

ALIGNMENT OF OPTICAL WAVEGUIDES

BACKGROUND OF THE INVENTION

The present invention relates to the alignment of a source of an optical signal (for example an end of an optical fibre) with an optical waveguide (for example another optical fibre). The invention is particularly suited to alignment of monomode fibres prior to splicing, and requires neither access to a remote free end nor a transparent buffer or jacket of one of the waveguides.

Many methods have been proposed in the prior art for aligning fibres. The simplest methods, perhaps, are mere mechanical methods where alignment between the outer surfaces of the fibres, generally of the claddings since the buffers and other outer layers will be removed for alignment, is achieved by laying the fibres in a precisely machined V-groove or similar structure. The invention, of course, is to align the fibre cores, and this method works tolerably well for multi-mode fibres, which have cores of diameter say 50 microns within a cladding of diameter say 125 microns, since at these dimensions any core eccentricity is unlikely to be a significant problem.

The situation with monomode fibres is quite different. Here the core diameter is much smaller, typically 5–10 microns, and any core eccentricity can easily be sufficiently great with respect to the core size that alignment of the claddings allows no transmission of core modes.

That problem has in general been solved by optical, rather than mere mechanical, methods of alignment; an optical signal is directed into the core of one fibre and withdrawn from the other fibre, the efficiency of transmission from one fibre to the other giving an indication of the accuracy of alignment. When the fibres are properly aligned they are spliced in that position, for example by fusing or bonding them together.

One such optical method comprises injecting light into the core at one remote end of one of the fibres to be aligned, and monitoring the intensity of light emitted from the remote end of the other fibre. The ends to be joined are moved relative to one another until the emitted intensity reaches a maximum. A modification of this basic idea is disclosed in DE No. 2,626,839 (Siemens) where it is suggested that instead of seeking the maximum intensity of light emitted at the end of the other fibre, one can seek the minimum amount of light scattered away from the fibres at the fibre junction. The assumption, presumably, is that if light is not scattered away from the fibres and into detectors placed around the junction, then it is being transmitted into the other fibre. Whilst this modification has the advantage of not required access to a remote end of the other fibre (which would be inconvenient because it may be a large distance away from the splice position), it is not clear that a lack of such scattering can be directly correlated to successful transmission of light along the other fibre. For example generation of cladding modes, rather than the desired core modes, in the other fibre would appear also to be at the expense of light scattered at the junction.

Access to a free end of a fibre can also be avoided by injecting light into and withdrawing light from respective fibres at positions adjacent the ends to be spliced. An excellent method for doing this is described and claimed in GB No. 2,100,463B. The fibre is bent at some point near the splice to be made and an optical coupler is placed adjacent the fibre buffer, allowing an optical signal to be injected into or withdrawn from the fibre core via the fibre buffer. Whilst this method gives good results it is clearly not applicable to cabled fibres or other fibres having opaque buffers or jackets.

We have now devised a method of aligning, which does not need (although it may make use of) a remote end of a fibre or a transparent fibre outer layer. The invention is based on the different backscattering performance of core modes, cladding modes and buffer modes etc. Backscattering of light will occur at optical interfaces, and in addition there will be a continuum of reflected energy by a phenomenon called Raleigh backscattering.

SUMMARY OF THE INVENTION

The present invention provides a method of aligning an optical signal source and a waveguide, which comprises:

(a) directing the signal into the waveguide;
(b) monitoring the intensity of the signal backscattered along the waveguide; and
(c) altering the relative position of source and waveguide in response to said intensity.

The optical signal source preferably comprises a second waveguide, especially an optical fibre, particularly a monomode optical fibre. The first-mentioned waveguide is also preferably an optical fibre, particularly a monomode fibre. The invention is particularly useful when the first-mentioned waveguide has a substantially non-transparent buffer, jacket or other coating.

The method will generally comprise approximately aligning the two fibres, injecting an optical signal into one of them, monitoring the intensity backscattered along the other fibre, altering their relative positions for examply by means of step motors driving some form of fibre clampsuntil a maximum intensity of backscattered signal is noted, and then either joining the fibres to one another, or fixing each in a connector part, which parts can in turn be fixed together in a precise relationship.

The signal is preferably generated by a laser or a light emitting diode, and the backscattered signal is preferably detected using an optical power meter. It is an advantage that a simple continuous signal can be used, although if desired a pulsed source, such as an optical time domain reflectometer may be employed. Time domain reflectometry may not however be suitable for producing a feedback signal for alignment since the step motors generally used require a reasonably strong signal that varies quickly with fibre alignment.

The intensity of the backscattered light or other optical signal will depend on the material through which the light is propagating in the forward directions and on the precise path that it takes. Light will in general be backscattered from each point of its forward path, and the nature of the material through which it passes, the intensity of the forward signal at that point, the attenuation to be suffered on the return path, and the length of that return path will all affect the intensity of a backscattered signal detected at any given time. Thus, information can be gained from the backscattered signal on the path that the forward signal has taken, particularly whether it propagated in a fibre core or a fibre cladding. A difference in backscatter signal may be noted because of the different materials properties, such as different refractive indices, but generally the more important reason is the different path lengths in the core and cladding: core modes will in general be bound, whereas cladding modes will be lost to a buffer where they will be attenuated.

This second effect will mean a greater intensity of backscattered light is observed when the optical source is aligned with the core. If the source emits a continuous optical signal the backscattered signal detected will be a summation of the light backscattered from all points along the path of the signal. A disadvantage in some application of using a continuous source may be that it may be difficult to ensure that the detector detects only backscattered signal, and ignores both the generally brighter forwardly propagating light and any Fresnel reflections for example from the ends to be aligned of the two fibres.

The forwardly propagating signal from the source can be prevented from reaching the detector by having the detector supplied with light from an optical directional coupler. For example, the fibre into which the signal is launched may be bent and a detector placed on the convex side of the bend and oriented towards that end.

Alternatively a detector and an optical signal may be coupled to one of the fibres to be joined by means of a coupler which itself comprises two fibres (or other waveguides) that lie along side one another and are joined together at one end in a pig-tail configuration. The common end is then aligned with that the fibre to be joined. Such alignment need not be difficult, due to the large possible size of the pig-tail connector.

Whether or not Fresnel reflections are a problem will depend on their intensity, and on the sensitivity of the optical detector. Their effect may, however, be reduced by providing an index-matching material around the ends, or using a polarization technique, or eliminated by employing a pulsed optical signal from an optical time domain reflectometer. Here high intensity light pulses, commonly from a laser, are directed at the waveguide, generally through the second waveguide. The light is backscattered by Raleigh backscattering, throughout the length of the waveguide. The signal received by the detector will thus be spread out in time since light reflected from further down the waveguide will be detected later than that reflected from a nearer point due to the longer outward and return journeys. Due to attenuation of the signal by the material of the waveguide, the intensity of the detected signal will fall off with time, and the rate at which the intensity decreases will indicate, for example, whether bound core modes or unbound cladding modes are being generated. Furthermore, this technique allows one to determine how far down the waveguide the signal has propagated (for example a fresnel reflection at the far end of the fibre, which may be enhanced by coating that end or aligning it with a reflective surface, may be identified), and it allows fresnel reflections at the ends to be aligned to be ignored since such reflections will be represented as identifiable peaks in the detector output.

Once two fibres have been aligned they may be held in that alignment or joined or spliced together. A permanent splice may be made by fusing or bonding their ends together, for example by aligning the fibres in a tube containing a curable adhesive and then curing the adhesive. A permanent or temporary joint may be produced by fixing each fibre end in a connector part and then fixing the connector parts together in a precise relationship. This can be done by fixing the parts together and then aligning the fibres within the parts, the parts being machined such that they fit together in the relationship desired. Alternatively, the fibres may be fixed in respective connector parts, the parts having some means whereby, with the help of the method of the invention, they may be properly aligned. Such means may comprise as one or both of the parts, a series of eccentric members, one within another, which on relative rotation causes the fibre they hold to be moved.

BRIEF DESCRIPTION OF THE DRAWINGS

FIG. 1 shows schematically the use of a beam splitter in the invention;

FIG. 2 shows the use of an optical directional coupler in the invention;

FIG. 3 shows local detection;

FIG. 4 shows local injection and detection in connection with the invention; and FIG. 5 shows a two part coupler for use with the invention.

DETAILED DESCRIPTION OF THE DRAWINGS

FIG. 1 shows an optical signal source 1 in alignment with a waveguide 2, comprising an optical fibre which comprises a core 3, cladding 4 and buffer and optionally jacket 5. An optical signal is passed via a beam splitter 6 to the fibre 2. When the optical signal is aligned with the core 3 as shown a backscattered signal is produced which is directed by the beam splitter 6 to a detector 7. If, however, the source 1 and fibre 2 were not properly in alignment, there would be either no backscattering (for example if the signal missed fibre 2 entirely) or a reduced intensity of backscattered signal (for example if the forwarded signal is incident to the fibre cladding or buffer where it will be attenuated.

There will be some fresnel reflection from the left hand end face of fibre 2 and, as explained above, the use of a time domain reflectometer as detector 7 may be used to distinguish such reflection. Fresnel reflection from the remote end (not shown) of fibre 2 will of course indicate that the optical signal has been successfully launched into the core 3 if fibre 2 has any significant length since cladding and buffer modes would be lost. Fresnel reflection from the remote end may be identified using a time domain reflectometer since the time delay will be known for a given length of fibre, although this will generally not be necessary.

The light may be generated by a laser 8 which in FIG. 1 is being aligned directly with the fibre 2.

In FIG. 2, a second waveguide 9 is the optical signal source that is to be aligned with waveguide 2. An optical signal may be generated by a laser 8 and fed to the second waveguide 9 via a directional optical coupler 10. The coupler 10 is also connected to a detector 7 in such a way that no light passes directly to it from the laser 8. The coupler 10 may comprise two fibres (or other waveguides) whose cores are joined or contact one another as shown. The figure is to be regarded as only schematic and in practice the limbs of the coupler from the laser 8 and to the detector 7 could be almost parallel at the position where they meet.

The coupler may be integral with the second waveguide 9 or it may be merely aligned with it or temporarily or permanently joined to it.

An index-matching material is shown as stippling between the two waveguides to reduce reflections from their end faces. Such a material could serve also to bond the fibres together, and may for example comprise a UV curable adhesive.

The second waveguide 9 or at least part of the coupler 10 may be of a type that will support a signal of only a particular polarization, and optionally the laser of some means (such as a connector or other part comprising a ¼ wave plate formed for example from a chosen thickness of a material such as calcite or mica that has the property of retarding one of the components of the wave relaive to the other) may be provided between the ends of the fibres that rotate the plane of polarization, say 45°. Signal incident on the near end face of the fibre 2 would therefore be polarized in the plane altered by 45°, and any Fresnel reflection would be again subjected to a 45° shift. (There will also in general be a 180° phase shift on reflection but this has no effect on the plane of polarization.) Such Fresnel reflection would therefore be polarized 90° out of alignment with the plane that could be supported by the fibre 9 or coupler 10 and would not therefore be detected. In contrast, a signal that had travelled any significant distance along fibre 2 and then been backscattered would be essentially non-polarized (normal fibre having the effect of depolarizing a polarized beam), and thus approximately 50% of such backscattering would reach the detector 7. Thus Fresnel reflection has been overcome without the use of an index-matching liquid or time domain reflectometry.

This is illustrated in FIG. 3 where an optical signal is injected into a fibre 9 by a laser 8 placed at the end of the fibre, and backscattered light is detected by a detector 7 placed at a bend in the fibre. The arrows on the horizontal line above the fibre schematically represent orientation of the plane of the polarized light emitted by the laser. Light polarized in this plane is supported by the fibre 9, and therefore the signal makes it to the end of the fibre where there is positioned a ⅛ wave plate 10 which serves to rotate the plane of polarization by 45°. This rotation is represented by the oblique arrow at the right hand end of the top horizontal line. The signal then emerges from the plate 10 and is partly reflected back again by the end face of the fibre 2 with a 180° phase change. The intention, of course, is that the reflected signal be ignored because it gives no information regarding fibre alignment. The reflected signal then passes again through plate 10 and its plane of polarization is further rotated 45°, and this is represented by the arrow on the horizontal line below the fibres. This return signal can be seen to be polarized in a plane orthogonal to the plane that can be maintained in Fibre 9. Hence the signal is attenuated and does not reach the detector 7. It is not necessary that this polarizing maintaining property of fibre 9 be present along the whole length of one of the fibres, and in fact only lengths of such material sufficient to attenuate the reflection need be placed in the path of the signal.

The portion of the signal incident of fibre 2 that is not reflected by fresnel reflection, however, is backscattered by all points in fibre 2. Passage in fibre 2 (preferably of at least 1 meter, particularly at least 2 meters) results in a loss of polarization, and hence there will be light present which, after the effect of the plate 10, is able to be transmitted by fibre 9 to reach the detector 7.

The drawing shows in addition to the plate 10, some means for focusing the light, represented as a rectangle to the left of plate 10. Such means is not however necessary.

Since it is desirable that detector 7 read the maximum signal possible it would be desirable that the minimum light is lost at the bend at which it is positioned on its outward journey, and that the maximum light leaves the fibre at that bend on its return journey. Since these two desires are incompatible (the same amount generally being lost in both directions) a compromise has to be reached. It can readily be seen that the optimum occurs when half of the light leaves the fibre at each passage of the bend. The fraction available for the detector 7 is thus $0.5 \times 0.5 = 0.25$ of the amount initially in the fibre (ignoring other losses for this purpose). (For the sake of comparison the amount available if the fraction lost (or retained) at the bend is 0.1, would be $0.1 \times 0.99 = 0.099$.)

In FIG. 4 a second waveguide 9 is bent in order to inject a signal from laser 8 and to detect the backscattered light by detector 7. It can be seen that by proper positioning and orientation of detector 7, direct coupling of light from the laser can be avoided or substantially reduced.

FIG. 5 shows a coupler by means of which two fibres 2 and 9 can be aligned and optionally fixed together. The coupler comprises first and second parts 11 and 12. One or both of the parts may comprise a series of eccentric members 13, 14, and 15 which may be relatively rotated to move the fibre they hold.

We claim:

1. A method of aligning an optical signal source and a waveguide, which comprises:
    (a) directing an optical signal into the waveguide;
    (b) monitoring an intensity of the signal backscattered along an intermediate longitudinal length of the waveguide; and
    (c) altering the relative positions of the source and the waveguide in response to said intensity so as to substantially maximize said intensity.

2. A method according to claim 1, in which said source comprises a second waveguide.

3. A method according to claim 2, in which at least one of the waveguides comprises a single mode optical fibre.

4. A method according to claim 1, in which the waveguide is surrounded by a substantially non-transparent coating.

5. A method according to claim 1, in which relative movement between source and waveguide is prevented after said intensity has been substantially maximized.

6. A method according to claim 1, which additionally comprises attaching the source to a first connector member and attaching the waveguide to a second connector member, the relative positions of the first and second connector members being altered in response to said intensity.

7. A method according to claim 6, in which the source is fixed eccentrically with respect to the first connector member and the waveguide is fixed eccentrically with respect to the second connector member; the first connector member being rotated with respect to the second connector member in response to said intensity.

8. A method according to claim 1, in which an optical signal is transmitted to said source via an optical directional coupler from which backscattered signal is detected.

9. A method according to claim 1, in which an optical signal is transmitted to said source via a beam splitter, from which reflected backscattered signal is detected.

10. A method according to claim 1, in which the intensity of backscattered signal is monitored by time domain reflectometry, such that fresnel reflection at an end of the waveguide is ignored.

11. A method according to claim 1, in which an optical signal is transmitted from said source via a second optical waveguide, said second waveguide supporting substantially only one plane of polarization of said signal.

12. A method according to claim 11, in which the optical signal is transmitted from the second waveguide to the first mentioned waveguide via means for rotating substantially 45° the plane of polarization of the signal in the second waveguide.

* * * * *